(12) United States Patent
Aaltonen

(10) Patent No.: US 7,757,146 B2
(45) Date of Patent: Jul. 13, 2010

(54) TRANSMISSION OF DATA WITH FORWARD ERROR CORRECTION INFORMATION

(75) Inventor: Janne Aaltonen, Turku (FI)

(73) Assignee: Nokia Corporation, Espoo (FI)

( * ) Notice: Subject to any disclaimer, the term of this patent is extended or adjusted under 35 U.S.C. 154(b) by 1094 days.

(21) Appl. No.: 10/549,105

(22) PCT Filed: Feb. 26, 2004

(86) PCT No.: PCT/IB2004/000685

§ 371 (c)(1),
(2), (4) Date: May 15, 2006

(87) PCT Pub. No.: WO2004/084477

PCT Pub. Date: Sep. 30, 2004

(65) Prior Publication Data

US 2006/0236153 A1 Oct. 19, 2006

(30) Foreign Application Priority Data

Mar. 18, 2003 (GB) .................................. 0306184.3

(51) Int. Cl.
*G06F 11/30* (2006.01)
*G08C 25/00* (2006.01)
*H03M 13/00* (2006.01)
*H04L 1/00* (2006.01)

(52) U.S. Cl. ....................................... 714/746; 370/217

(58) Field of Classification Search ............ 714/746, 714/4; 370/217
See application file for complete search history.

(56) References Cited

U.S. PATENT DOCUMENTS

| 4,447,903 | A | 5/1984 | Sewerinson |
| 5,968,197 | A | 10/1999 | Doiron |
| 7,020,821 | B2 * | 3/2006 | Chang ........................ 714/746 |
| 7,170,908 | B2 * | 1/2007 | Chow et al. ................. 370/536 |
| 2002/0016933 | A1 * | 2/2002 | Smith et al. .................... 714/4 |
| 2004/0081082 | A1 * | 4/2004 | Moody et al. ............... 370/217 |

FOREIGN PATENT DOCUMENTS

| WO | WO 03/061179 A1 | 7/2003 |
| WO | WO 03/094357 A1 | 11/2003 |

OTHER PUBLICATIONS

PCT International Search Report (as published), International Application No. PCT/IB2004/000685, Date of Completion of Search—Jun. 28, 2004.

* cited by examiner

*Primary Examiner*—Sam Rizk
(74) *Attorney, Agent, or Firm*—Locke Lord Bissell & Liddell LLP

(57) ABSTRACT

A method of transmitting content data to one or more receiving devices (5a, 5b) over a first communication channel (7) and transmitting recovery information associated with the content data over a second communication channel (9). The recovery information may be transmitted as a response to a request from the receiving device.

18 Claims, 6 Drawing Sheets

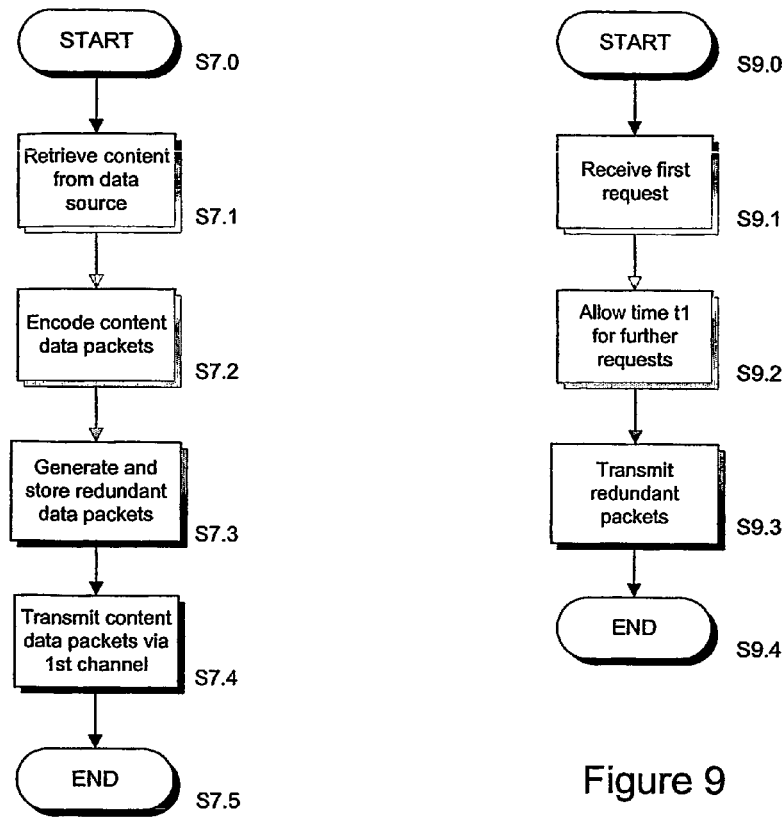
Figure 7
Figure 9
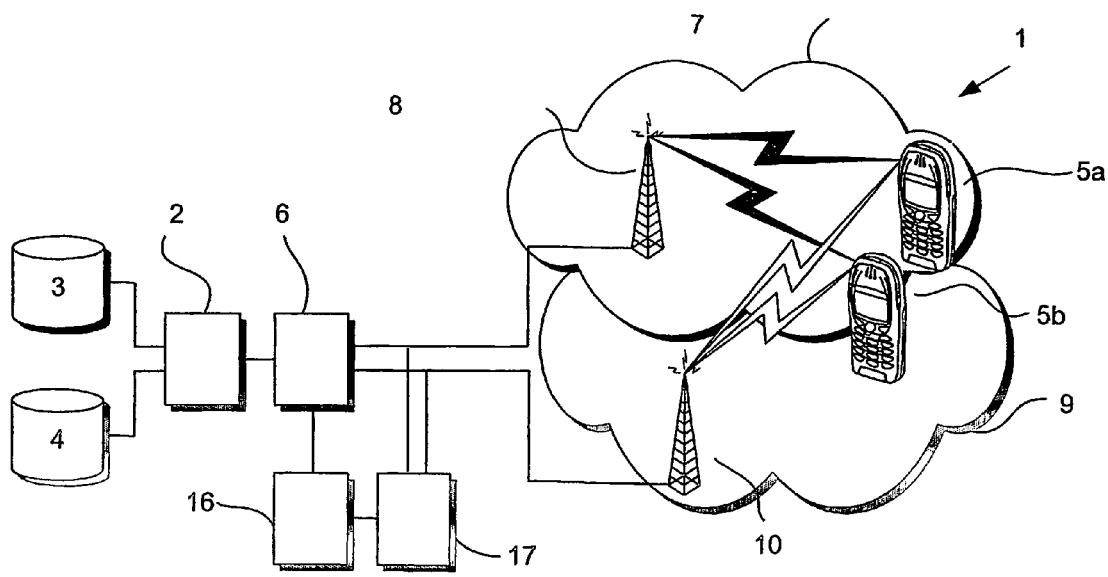
Figure 6

TRANSMISSION OF DATA WITH FORWARD ERROR CORRECTION INFORMATION

The invention relates to the transmission of data and associated forward error correction information to one or more receiving devices and is particularly suitable for, but not limited to, multicasting or broadcasting audio, video or other data to portable receiving devices.

In a communication system, a content provider may send data, such as audio, video or multimedia clips, software or other data files, to one or more users. The content divided into a sequence of data packets for transmission to one or more receiving devices. However, packets of data may be lost or become corrupted in transit.

There are a number of techniques for ensuring the reliable reception of data. A first method requires bi-directional communication between the transmitter and receiving device and a suitable communication protocol, such as TCP/IP, so that a receiving device can send an acknowledgement message (ACK) when a data packet is received and successfully decoded. Alternatively, the receiving device may be configured to send a negative acknowledgement message (NACK) if a data packet has not been received or if a received data packet contains errors and cannot be decoded. In this case, the transmitter responds to a NACK message by re-transmitting the relevant data packet to the receiving device.

This method is useful for unicast data delivery, but if data is transmitted to a number of receiving devices, the use of ACK or NACK messages and re-transmission of data packets may lead to traffic congestion, particularly where a plurality of receiving devices require the re-transmission of different data packets. This problem is exacerbated in a system where, if a first receiving device has lost a data packet, the data packet is re-transmitted to all the receiving devices that received the original transmission, regardless of whether or not it is required. In wireless communication systems, this method may result in a significant load on the air interface and, as the demand for the provision of Internet type services in mobile receiving devices rises, the efficient use of air interface bandwidth becomes an increasingly important consideration.

An alternative technique of ensuring reliable reception of content entails repeating the transmission of the entire data packet sequence. A receiving device that has missed a data packet, or has received a corrupted data packet, can receive the corresponding data packet in the repeated transmission and insert it into its correct position in the sequence. Any copies of data packets that were received in the original transmission are discarded. This method does not require bi-directional communication between the content provider and receiving device, and so is more suitable for multicast and broadcast applications, as well as allowing greater flexibility regarding the types of communication networks and protocols used. However, the re-transmission of the entire data packet sequence regardless of whether it is required by each of the receiving devices needlessly increases the load in the air interface bandwidth and system resources. For example, a single repetition of the data packet sequence decreases the effective bandwidth of the transmission by a factor of 2. Furthermore, a significant proportion of the power consumption in a receiving device arises from the demands of a receiver during data reception. Therefore, this method may be wasteful and undesirable where the receiving device has only limited power available, for example in a mobile telephone powered by a battery.

The third technique for reliable delivery of data is Forward Error Correction (FEC), in which the content provider transmits a set of data packets carrying the content together with an associated set of redundant data packets, which carry recovery information. If the number of transmitted data packets, i.e. the content data packets and the recovery data packets, successfully decoded by a receiving device exceeds a predetermined threshold, the missing content can be reconstructed. The feasibility of a reconstruction is determined by the number of received data packets, regardless of which particular data packets that have been received by the receiving device.

Forward error correction can be implemented using of BCH (Bose, Chandhuri, Hocquenghem) codes. An important sub class of these is Reed Solomon codes that are suitable for use in digital video broadcasting. In general terms, packet level forward error correction can be implemented using BCH codes by transmitting M recovery data packets after each set of N content data packets. The sequence of content data packets can be reconstructed if at least N of the N+M transmitted packets are received.

In these systems, each of the receiving devices to which the transmission is directed receive the recovery information, whether or not it is required. Typically, the N+M content data packets and recovery data packets are transmitted in sequence, in the following order: n1, n2, n3, . . . nN, m1, m2, . . . mM, so that the sequence of content data packets n is transmitted before the recovery data packets m. If there are no transmission errors, the transmission of the M recovery data packets wastes network resources, while the unnecessary reception and processing of the M packets in mobile terminal consumes power.

In some cases, it may be possible to strike a balance between the number M of redundant data packets and reliability. The proportion of the transmission dedicated to the recovery information may be determined by the nature of the content. For example, if the content is streaming audio and/or video data, occasional loss of data, such as a small number of missing frames, may be tolerable. If, however, the content is a data file or software, it may be necessary for the file or program to be received error-free.

According to one aspect of the invention, there is provided a method of transmitting content to one or more receiving devices, comprising generating recovery data for use in forward error correction of the content, transmitting the content to said receiving devices over a first communication channel and transmitting the recovery data to one or more of said receiving devices over a second communication channel.

According to another aspect of the invention, a method of transmitting content to one or more receiving devices comprises generating recovery data for use in forward error correction of the content, transmitting the content to said receiving devices over a first communication channel and, in response to a request from one or more of said receiving devices, transmitting the recovery data to said one or more receiving devices over a second communication channel.

In yet another aspect of the invention, a method of receiving content from a source comprises receiving one or more content data packets from a first communication channel, receiving recovery data for use in forward error correction of the content data packets from a second communication channel, determining whether the received content data packets contain errors and, if so, whether said errors are correctable and, in response to a positive determination, performing forward error correction of the received content data packets using the received recovery data.

In a further aspect of the invention, a method of receiving content from a source comprises receiving one or more content data packets from a first communication channel, determining whether the received content data packets contain errors and, if so, whether said errors are correctable and, in response to a positive determination, sending a request for recovery data to the source, receiving said recovery data from a second communication channel and using the recovery data for performing forward error correction of the content data packets.

The invention also includes corresponding transmitting and receiving apparatus, as will be evident from the claims hereinafter.

The first and second communication channels may be provided by first and second communication networks respectively, i.e. a hybrid network. Where a receiving device has failed to successfully receive the content data due to factors such as poor signal strength, a second communication network may, in some scenarios, provide a receiving device with a stronger signal, increasing the likelihood that a sufficient number of content data packets and recovery data packets for performing a forward error correction procedure will be received.

In such a hybrid network, the first transmission path may be a uni-directional network, such as a terrestrial Digital Video Broadcasting (DVB-T) network and the second transmission path may be bi-directional, such as a Third Generation (3G) network, for transmitting both a message from the user requesting the recovery information and the recovery information itself.

The data recovery packets may be created separately, by different apparatus from that used to produce data content packets.

A communication system can then be configured so that recovery information can be selectively received, e.g. by those receivers that request it or depending on the type of content. The reliability of a transmission can be guaranteed in accordance with the type of data or by agreement with the user and allows the user to be billed for this service accordingly.

In some embodiments of the invention, content data may be sent as groups of data packets or datagrams. The content data packet groups may also be transmitted as recurring bursts repeatedly or periodically e.g. with time division multiplexing. The recovery information may be formed for each packet or a group of packets and it may be associated with the corresponding content packets. The recovery information may be transmitted respectively as single packets or as one or more groups of packets repeatedly or as a response to a received request. The content data and recovery data packets may comply with a particular standard, for example, DVB-T standards, and they are provided with a standard format header for identifying the type of the packet and associating information.

An embodiment of the invention will now be described with reference to the accompanying drawings, in which:

FIG. 6 is a schematic block diagram of a second embodiment of the invention;

FIG. 7 is a flowchart of a content data transmission process according to a second embodiment of the invention;

FIG. 9 depicts the transmission of recovery data to receiving devices according to the second embodiment;

Figure 1:
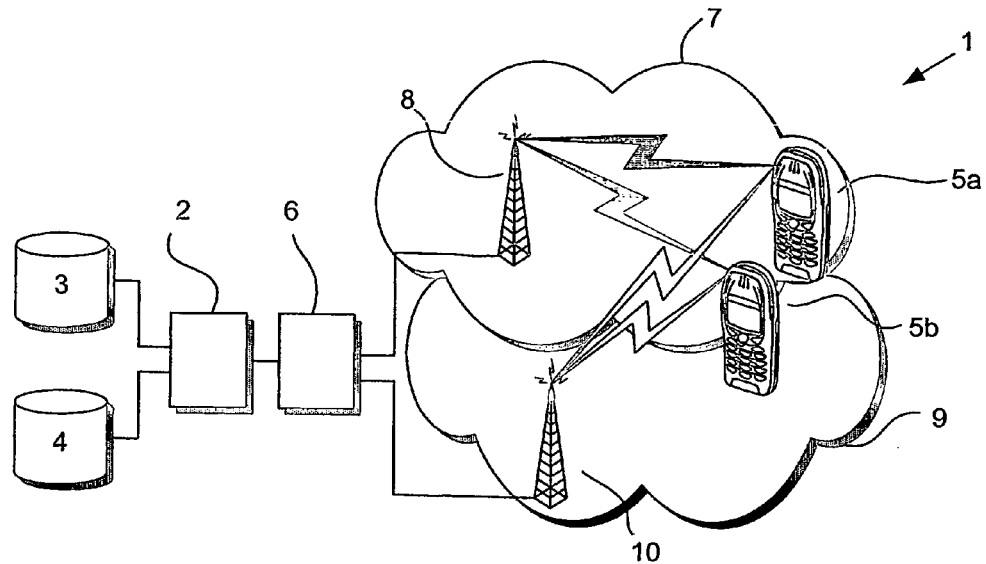
FIG. 1 is a schematic diagram of a communication system according to a first embodiment of the invention.

FIG. 1 is a block diagram of a communication system 1 according to a first embodiment of the invention. The communication system comprises a content provider 2 that has access to sources 3, 4 of content, such as audio-visual content, data files or images.

The content is transmitted using IP over DVB-T network, in what is known as an IP Datacasting (IPDC) service, to one or more receiving devices 5a, 5b. The receiving devices 5a, 5b, e.g. mobile telephones, are configured to receive data from at least two different communication channels.

The content data is transmitted to a network element 6, which is a server configured to receive the content data and to generate recovery data for use in forward error correction of the content data. The content data is transmitted to the receiving devices 5a, 5b via a first channel. In this example, the first communication channel is provided by a Digital Video Broadcasting terrestrial (DVB-T) network 7, which includes a transmitter 8. The content is broadcast to all suitable receiving devices 5a, 5b within a cell associated with the first communication network 7.

The recovery data is transmitted to the receiving devices 5a, 5b via a second communication channel provided by a Third Generation (3G) mobile network 9, which includes a transmitter 10.

It should be noted that the communication paths for the content and recovery data are shown in FIG. 1 in a simplified form. Other elements such as further transmitters, network elements or networks may be situated in these communication paths.

Figure 2:
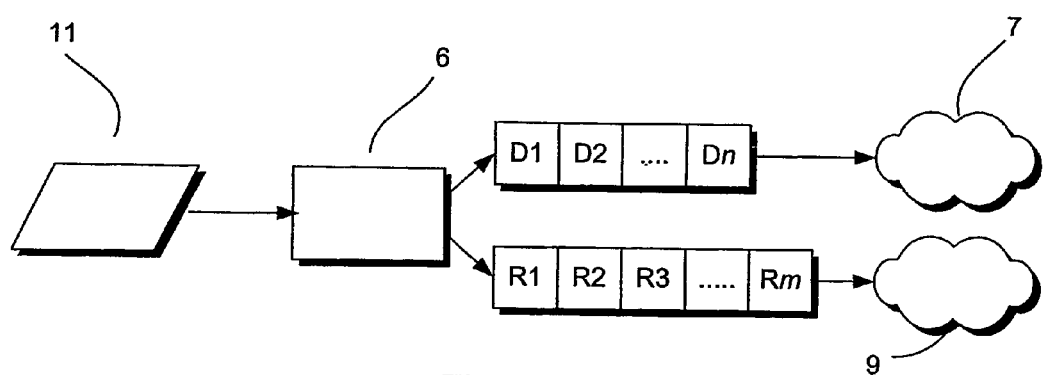
FIG. 2 depicts a method of transmitting data according to the first embodiment.
Figure 3:
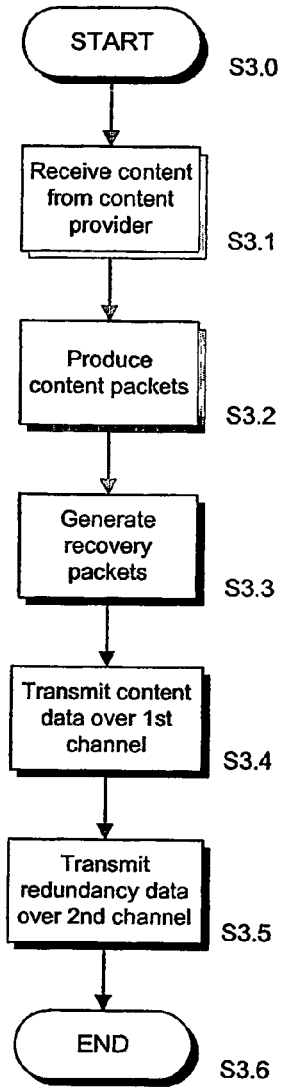
FIG. 3 is a flowchart of the method of transmitting data depicted in FIG. 2.

The procedure followed by the network element 6 and a receiving device 5a according to the first embodiment will now be described with reference to FIGS. 2 and 3. Starting at step s3.0, content in the form of a data file 11 is retrieved from content provider 2 (step s3.1). In this example, the data file 11 is in the form of a set of IP datagrams. An encoder within the network element 6 generates two set of data packets as follows. A sequence of content packets D1-Dn are formed from the content 11 and encapsulated according to the DVB Multi-Protocol Encapsulation (DVB-MPE) profile (step s3.2). A sequence of recovery packets R1-Rm, which convey recovery information for use in forward error correction of the content packets D1-Dn are generated from the content 11 based on Reed Solomon codes (step s3.3) and configured to packets that can be transmitted over the second communication network.

The content packets D1-Dn are and are sent to the receiving devices 5a, 5b over the first communication network 7 (step s3.4), while the recovery packets R1-Rm are delivered via the second communication network 9 (step s3.5). The procedure is then complete (step s3.6). This is shown schematically in FIG. 2.

The transmission steps s3.4, s3.5 may be performed sequentially or in parallel. As the content packets D1-Dn and recovery packets R1-Rm are transmitted separately, a user of a receiving device 5a, 5b can elect either to receive both the content and recovery packets D1-Dn, R1-Rm or to receive only the content packets D1-Dn. By doing so, the user is selecting an acceptable quality of service. This choice can be made in terms of a guaranteed quality of service in a subscription agreement between the user and content provider. Alternatively, the user may elect to receive the recovery data by joining an associated multicast group. The delivery mechanism used for transmitting the recovery data packets R1-Rm then depends on the number of receiving devices 5a, 5b electing to receive it. The recovery data R1-Rm may be broadcast, multicast or transmitted using a point-to-point delivery mechanism accordingly.

Figure 4:
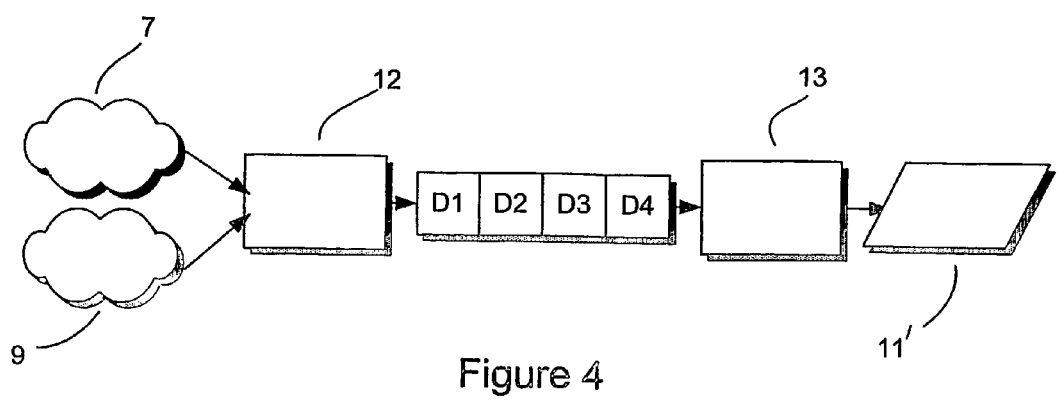
FIG. 4 depicts a method of receiving data according to the first embodiment.
Figure 5:
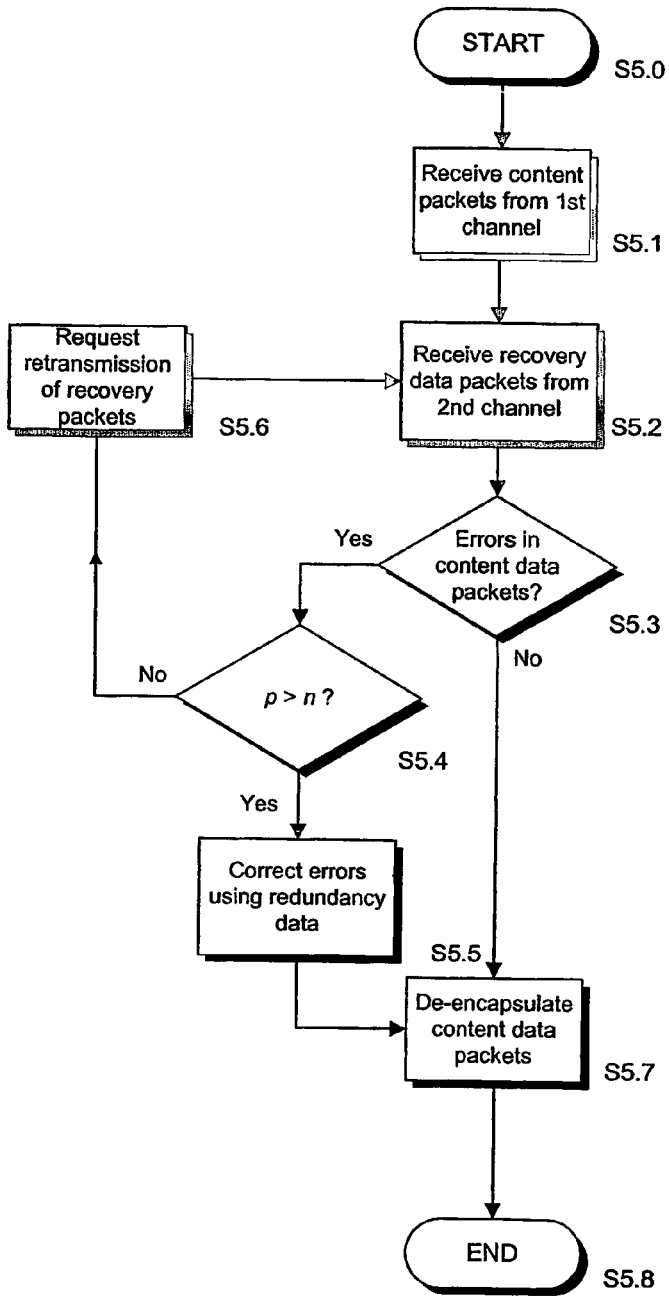
FIG. 5 is a flowchart of the method of receiving data depicted in FIG. 4.

A process for receiving data at a receiving device 5a according to the first embodiment of the invention is shown in FIGS. 4 and 5. Beginning at step s5.0, the content data D1-D4 and recovery data R are received (steps s5.1, s5.2) from the first and second communication channels in the first and second communication networks 7, 9 respectively.

An error correction module 12 determines whether the content packets D1-Dn contain errors or whether they have been received successfully (step s5.3). Where there are errors, for example, if one or more content data packets has been lost or corrupted, the error correction module 12 determines whether the combined number p of content and recovery packets that have been received is sufficient to allow reconstruction of the remaining content packets (step s5.4). Generally, packet level forward error correction can be performed if the receiving device 5a has successfully received at least n of the (n+m) transmitted data packets D1-Dn, R1-Rm, regardless of which particular data packets have been received. If this condition is met, the recovery data is used to reconstruct the missing content packets (step s5.5). If the number p of received data packets is below this threshold n, the receiving device 5a can request re-transmission of the data or in another embodiment of the invention to retransmission of the recovery data (step s5.6). Alternatively, if the number of errors are at a tolerable level, the receiving device 5a may simply drop the corrupted data.

If the receiving device 5a has obtained the full series of content data packets D1-Dn, either by receiving the series without any errors or by partially reconstructing one or more content data packets D1-Dn, the content data packets are de-encapsulated (step s5.7) by a decoder 13, to produce a copy of the original data file 11'. The data reception process is then complete (step s5.8).

In the first embodiment of the invention described above, the transmission of content data is always accompanied by the transmission of its associated recovery data R. However, if all the receiving devices 5a, 5b successfully receive the content data, the recovery data is not needed. In a second embodiment of the invention, the recovery data is transmitted only when required by a receiving device 5a, conserving receiver power and air interface bandwidth. The process of transmitting and receiving data according to the second embodiment of the invention will now be described, with reference to FIGS. 6, 7, 8 and 9.

In the second embodiment, another encoder is provided for making the recovery packets R. This encoder either sends the packets to a network operator or holds them until requested. A buffer is provided in the network, in which recovery packets R are held until requested. Referring to FIG. 6, the second embodiment is similar to the first embodiment of FIG. 1 but with the addition of an encoder/buffer 16 for producing the R packets, associated with a network operator 17.

Referring to FIG. 7, in operation, beginning at step s7.0, the network element 6 receives content to be transmitted to the receiving devices 5a, 5b from the content provider 2 or data source (step s7.1) and generates a series of data packets D1-Dn (step s7.2). A series of recovery packets R1-Rm is generated separately by encoder/buffer 16 e.g. using Reed Solomon codes and stored in the network (step s6.3). In this example, the encoder 16 is associated with a network operator 17 and the recovery packets may be stored by the network operator 17 until needed. The content packets are transmitted to the receiving devices 5a, 5b (step s7.4) over a first communication network 7, via-transmitter 8 using IP over DVB-T, completing the content transmission process (step s7.5).

Figure 8:
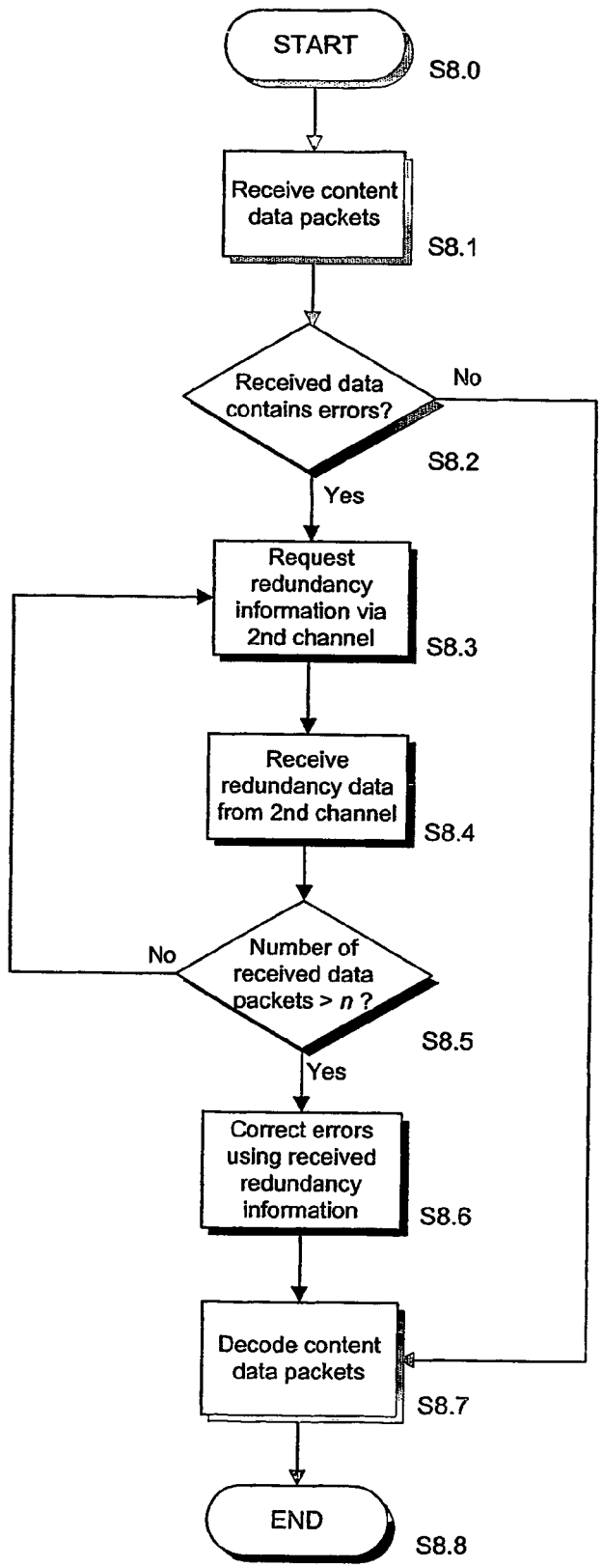
FIG. 8 is a flowchart of a data reception process according to the second embodiment.
Figure 10:
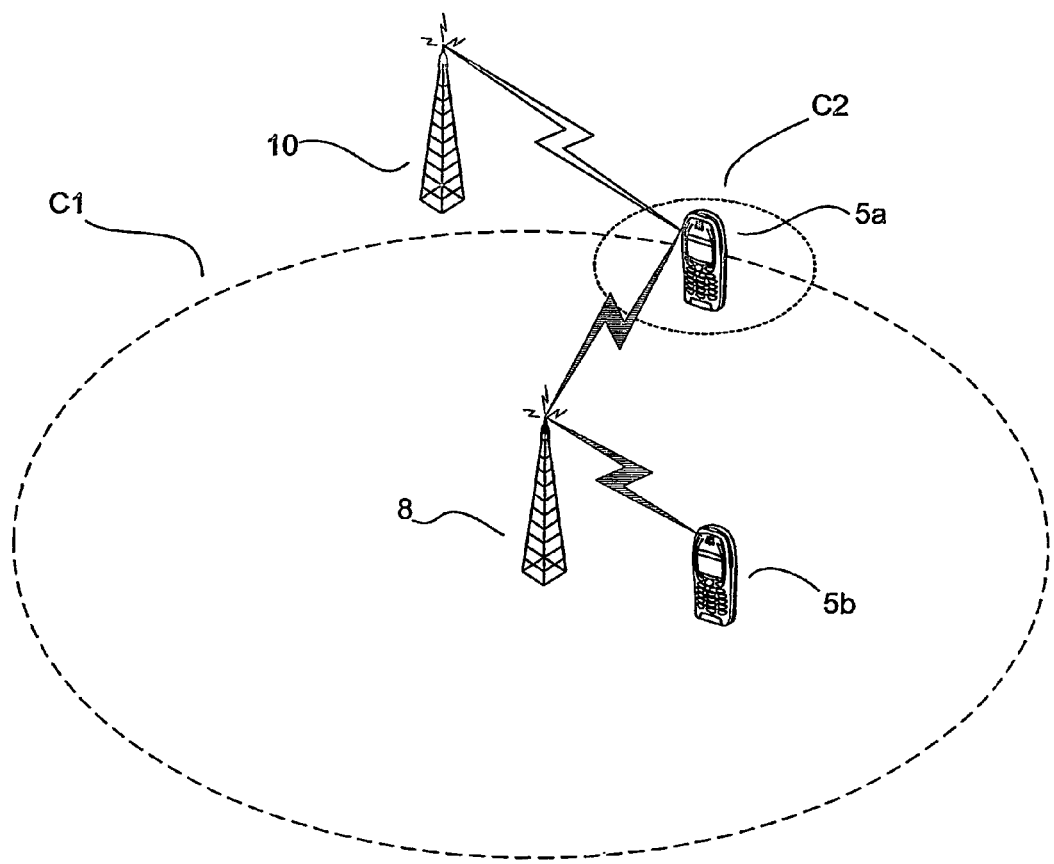
FIG. 10 depicts the transmission of content and recovery data to a receiving device according to a second embodiment of the invention.

Starting at step s8.0 in FIG. 8, receiving device 5a receives a series of content data packets (step s8.1) and determines whether it contains errors, such as missing or corrupted packets (step s8.2). If errors are present in the received content data, the receiving device 5a sends a message to the operator of network operator 17, requesting the recovery packets R1-Rm (step s8.3).

Beginning at step s9.0 in FIG. 9, having received and stored the recovery packets R1-Rm, the network operator 17 receives the request from the receiving device 5a (step s9.1). The network operator 17 then allows a limited period of time t1 for the reception of further requests from other receiving devices 5b (step s9.2). After the expiry of time period t1, the stored recovery packets R1-Rm are retrieved and transmitted to the one or more receiving devices 5a, 5b that have submitted requests (step s9.3). Where more than one receiving device 5a, 5b has requested the recovery packets R1-Rm, the network operator 17 transmits the recovery packets R1-Rm using a multicast or, if necessary, broadcast delivery mechanism over the second communication network 9, via transmitter 10. Alternatively, the network operator 17 may be configured to respond to each request by transmitting the recovery packets R1-Rm using a point-to-point delivery mechanism. The transmission of the recovery packets is then complete (step s9.4). Furthermore, based on the number of requests, the network operator 17 may resend the whole broadcast transmission through the first communication network.

On reception of the recovery data packets R1-Rm (step s8.4), the receiving device 5a determines whether it has received a sufficient number n of transmitted data packets D1-D4, R to permit reconstruction of the remaining content data packets (step 8.5). If this condition is not met, the receiving device 5a sends a further request to the network operator 17, requesting a repeat transmission of the recovery data R (step s8.3). The procedure shown in FIG. 9 is then repeated by the network operator 17.

The receiving device 5a repeats steps s8.3, s8.4 and s8.5 until it has received n or more of the transmitted data packets D1-Dn, R before correcting errors in the content data packets D1-Dn using the recovery information R (step s8.6). The content data packets D1-Dn are then decoded (step s8.7), completing the reception process (step s8.8).

An example of a situation in which a plurality of receiving devices 5a, 5b may have different data reception quality is shown in FIG. 9. In this figure, a first receiving device 5a is located at the edge of a cell C1 in the first communication network 7, while a second receiving device 5b is located well within the boundary of cell C1. When the transmitter 8 transmits the content packets D1-Dn, the signal received by the first receiving device 5a is likely to be weaker than that received by the second receiving device 5b and, therefore, the series of content data packets D1-Dn received by the first receiving device 5a is more likely to contain errors. It is therefore more likely that the first receiving device 5a will require the recovery data R, which is transmitted over the second communication network 9 by transmitter 10. In this example, the second communication network 9 is associated with a different set of cells C2 and so the reception quality for the recovery packets R1-Rm may exceed that of the content packets D1-Dn, increasing the likelihood that a sufficient number of transmitted data packets D1-Dn, R1-Rm will be received by the first receiving device 5a for performing forward error correction.

Figure 11:
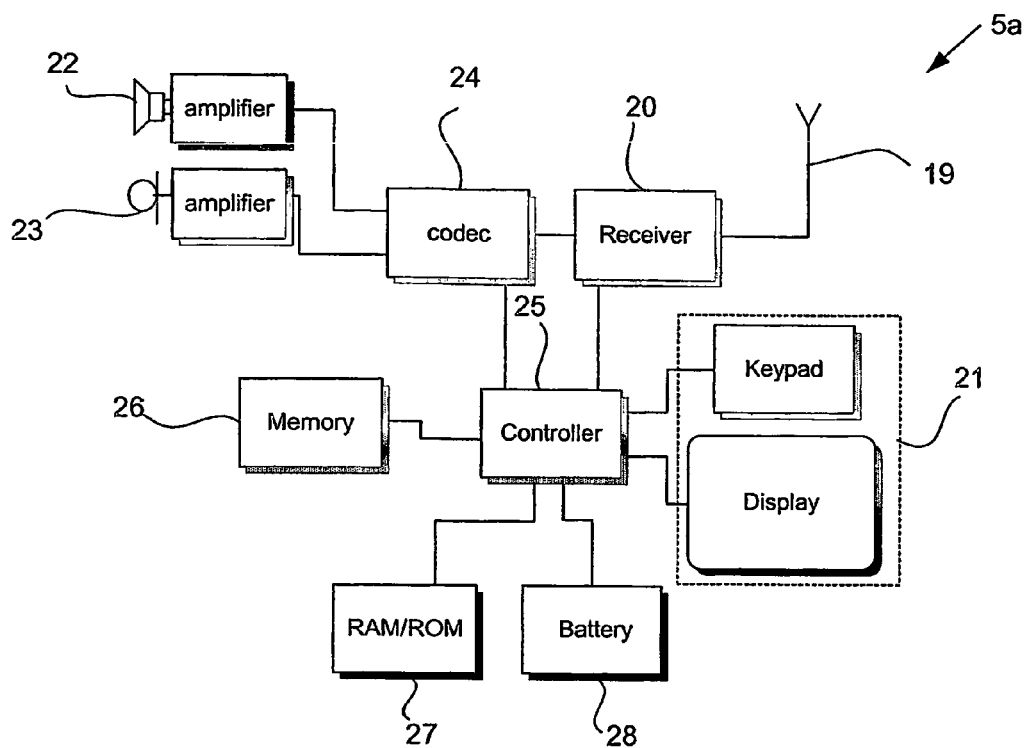
FIG. 11 is a block diagram of a receiving device for use with the first or second embodiment.

The receiving device 5a may be a mobile telephone, as shown in FIG. 11, which receives incoming data using one or more antennae 19 or several antennas and one or more receivers 20. For example, multiple antennae 19 and receivers 20 would be needed where the first and second communication network utilise different radio technologies. The receiving device further comprises a user interface 21, with a keypad and display, a speaker 22, a microphone 23 and codec 24. The operation of the mobile telephone 5a is controlled by a controller 25, which has associated memories 26, 27. The mobile telephone 5a is powered by a battery 28. As the reception of data consumes a large proportion of the battery power, the second embodiment of the invention, in which the recovery data R is transmitted only on request, is particularly advantageous for such a device. The method of providing redundancy packets over the other communication network makes it possible to have terminals, which do not have any error correction implemented (low end terminals). Subscribers having 'high end' terminals could have as extra benefit the possibility to get recovery packets from second network.

Figure 12:
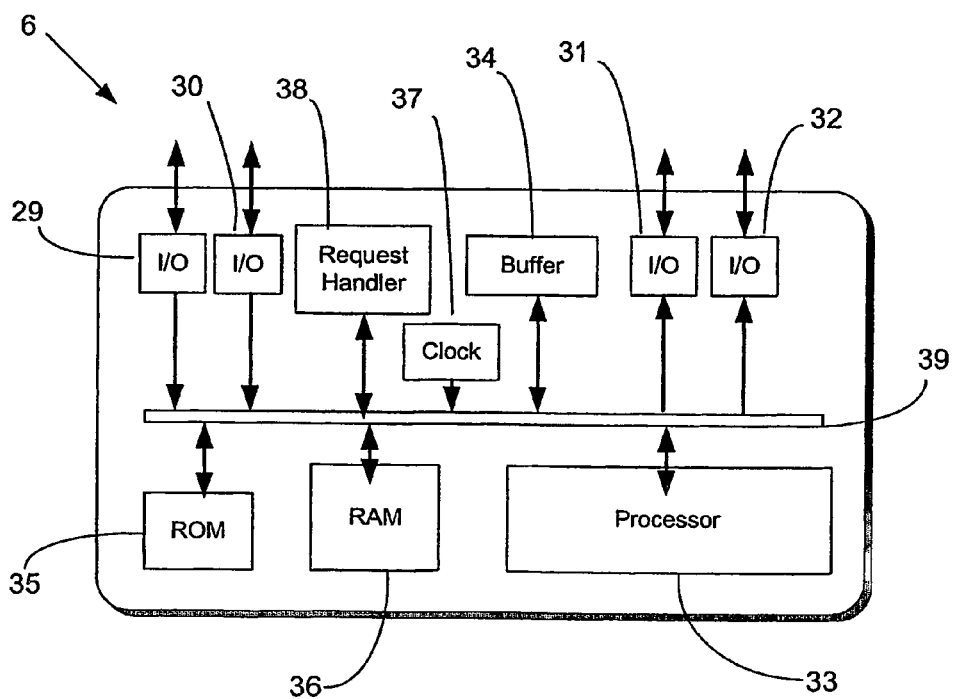
FIG. 12 is a block diagram of a network element for use with the first or second embodiment.

An example of a suitable network element 6 is shown in FIG. 12, which may be implemented on a standard industrial computer. The device 2 comprises input/output interfaces 29, 30, 31, 32 for communicating with the data sources 3, 4 and the networks 7, 9. The operation of the content provider 2 is monitored and controlled by a processor 33, including the generation of recovery data and data encapsulation processes. A buffer 34 is also included for storing content and recovery data as required, memory facilities 35, 36 and a clock 37. A request handler 38 handles requests for content data D1-Dn and, depending on the implementation of the invention, requests for recovery data R1-Rm. The various components communicate with one another via a data bus 39. The functionality can be split to different network elements. For example, the recovery packets may be generated by one network element and the decision of whether to send them immediately or on request can be made elsewhere.

The invention has been described by way of example and is not limited by the specific details of the first and second embodiments. In particular, the first and second communication channels may be provided by a single network instead of a hybrid network, so that, while logical delivery pipes for the content data D and recovery data R are separate, they are not physically different.

The recovery data is not necessarily generated using Reed Solomon codes, in other embodiments of the invention other type of codes are also applicable. The buffer can be at network element in other embodiments of the invention.

The invention may be used to transmit data using delivery mechanisms other than IP datacasting and protocol profiles other than DVB MPE. The invention may be applied to delivery of data to one or more receiving devices 5a, 5b using a point-to-point mechanism, multicasting or broadcasting.

It is not necessary for the receiving devices 5a, 5b to be mobile telephones as the invention is applicable to other receiving devices, such as personal computers and personal digital assistants, whether fixed or mobile. Where a receiving device is fixed, its location within a cell of the first communication network, for example its proximity to the edge of the cell, may determine whether or not the recovery data is transmitted to it in a method according to the first embodiment of the invention.

The communication system need not comprise a wireless communication network 6, 8. While the embodiments described included a DVB-T network, the invention may be used with other types of networks, digital and non-digital, including other digital broadcast networks such as DVB-S (satellite), DVB-C (cable), Integrated Services Digital Broadcasting (ISDB), ATSC Digital Television or Digital Audio Broadcasting (DAB) and, potentially, forthcoming DVB-MHP (Multimedia Home Platform) networks and 3G broadcast networks providing, for example, Multimedia Broadcast/ Multicast Service (MBMS), can be used as the first communication network.

Furthermore, it is not necessary for the second communication network to be a 3G mobile network.

In addition, the first communication network may be uni-directional or bi-directional. Similarly, the second communication networks may be uni-directional or bi-directional.

The first and second communication networks may be the same network, where there is logical separation of transmitted content data packets and recovery data packets. For example, a broadcast mode of a 3G network can be used to transmit the content data packets while the recovery data packets can be delivered using the same base station in a unicast or multicast mode. Alternatively IP over DVB-T or another DVB mode could be used for delivering content data packets with a different logical channel in the same IP over DVB-T base station being used for delivering recovery data packets.

In an embodiment where the first and second communication networks are based on same technology, the content data packets and recovery data packets may be sent using different base stations or stations. For example, in a 3G network, the content data packets may be sent using overlay macrocells and the recovery data packets sent using underlay microcells, or vice versa. In an example using IP over DVB-T, the content data packets and recovery data packets could be sent using different physical transport.

The invention claimed is:

1. A method of transmitting content to one or more receiving devices comprising:
    generating recovery data using a processor for use in forward error correction of the content;
    transmitting the content from a transmitter configuration to said receiving devices over a first communication channel; and
    in response to a request from one or more of said receiving devices, transmitting the recovery data from the transmitter configuration to said one or more receiving devices over a second communication channel.

2. A method according to claim 1, wherein the first communication channel is provided by a first communication network and the second communication channel is provided by a second communication network.

3. A method according to claim 2, wherein the first communication network is uni-directional.

4. A method according to claim 1, wherein the first communication channel and the second communication channel are logical channels in a first communication network.

5. A method according to claim 4, wherein the first communication network is uni-directional.

6. A method of receiving content from a source comprising:
    receiving, at a receiving device, one or more content data packets from a first communication channel;
    determining, at the receiving device, whether the received content data packets contain errors and, if so, whether said errors are correctable; and in response to a positive determination, sending a request for recovery data from the receiving device to the source, receiving said recovery data at the receiving device from a second communication channel and using the recovery data for performing forward error correction of the content data packets.

7. A method according to claim 6, wherein the first communication channel is provided by a first communication network and the second communication channel is provided by a second communication network.

8. A method according to claim 7, wherein the first communication network is uni-directional.

9. A method according to claim 6, wherein the first communication channel and the second communication channel are logical channels in a first communication network.

10. A method according to claim 9, wherein the first communication network is uni-directional.

11. An apparatus for transmitting content to one or more receiving devices comprising:
- a processor configured to generate recovery data for use in forward error correction of the content;
- a transmitter configuration operable to transmit the content to said receiving devices over a first communication channel and to transmit the recovery data to one or more of said receiving devices over a second communication channel; and
- an input interface for receiving requests from said one or more receiving devices;
- wherein the transmitter configuration is operable to transmit the recovery data over the second communication channel in response to the reception of a request.

12. An apparatus according to claim 11, further configured to transmit the content over a first communication network and to transmit the recovery data over a second communication network.

13. An apparatus according to claim 12, including a content provider for providing said content in packets for transmission through the first network, and a recovery data provider for providing said recovery data in packets for transmission through the second network.

14. A communication system comprising an apparatus according to claim 11.

15. An apparatus for receiving content from a source, comprising:
- a receiver operable to receive one or more content data packets from a first communication channel; and
- a processor configured to determine whether the content data packets contain errors and, if so, whether said errors are correctable, and, in response to a positive determination, to send a request for recovery data to the source and, in response to the reception of the recovery data from a second communication channel, to perform forward error correction using said recovery data.

16. An apparatus according to claim 15, wherein the first communication channel is provided by a first communication network and the second communication channel is provided by a second communication network.

17. An apparatus according to claim 15, comprising a mobile telephone handset.

18. A communication system comprising an apparatus according to claim 15.

* * * * *